United States Patent
Crumb et al.

(10) Patent No.: US 11,599,943 B2
(45) Date of Patent: Mar. 7, 2023

(54) COMPUTER METHOD AND GUI FOR DISPLAYING A REFLEXIVE INDEX PRICE FROM THE SETTLEMENT OF COMMODITY CONTRACTS

(71) Applicant: ABAXX TECHNOLOGIES CORP., Christ Church (BB)

(72) Inventors: Joshua Crumb, Christ Church (BB); Andrew Fedak, Christ Church (BB); Christopher A. Wiklof, Christ Church (BB)

(73) Assignee: ABAXX TECHNOLOGIES CORP., Christ Church (BB)

( * ) Notice: Subject to any disclaimer, the term of this patent is extended or adjusted under 35 U.S.C. 154(b) by 342 days.

(21) Appl. No.: 16/708,405

(22) Filed: Dec. 9, 2019

(65) Prior Publication Data

US 2020/0219089 A1  Jul. 9, 2020

Related U.S. Application Data

(60) Provisional application No. 62/776,918, filed on Dec. 7, 2018.

(51) Int. Cl.
| | |
|---|---|
| G06Q 40/04 | (2012.01) |
| G06Q 20/36 | (2012.01) |
| G06Q 20/38 | (2012.01) |
| G06Q 20/06 | (2012.01) |
| G06Q 50/06 | (2012.01) |
| G06F 16/27 | (2019.01) |

(Continued)

(52) U.S. Cl.
CPC ............ *G06Q 40/04* (2013.01); *G06F 16/27* (2019.01); *G06F 21/602* (2013.01); *G06Q 10/10* (2013.01);

(Continued)

(58) Field of Classification Search
None
See application file for complete search history.

(56) References Cited

U.S. PATENT DOCUMENTS

| | | | |
|---|---|---|---|
| 10,726,479 B2 * | 7/2020 | Bauerschmidt | G06Q 40/00 |
| 11,049,182 B2 * | 6/2021 | Pierce | G06Q 40/04 |

(Continued)

FOREIGN PATENT DOCUMENTS

WO  WO-2018097662 A1 *  5/2018 ......... H04L 63/0442

*Primary Examiner* — Neha Patel
*Assistant Examiner* — Jahed Ali
(74) *Attorney, Agent, or Firm* — Panitch Schwarze Belisario & Nadel LLP

(57) ABSTRACT

A computer method for establishing a commodity price index includes receiving, via a web server, transactions for a plurality of first electronic currency denominated commodity or commodity future contracts, and recording, with a server computer operatively coupled to the web server, settlement prices for the plurality of the first electronic currency denominated commodity or commodity future contracts on a distributed ledger. The computer method includes reading, with the server computer, from the distributed ledger, at least a portion of the first electronic currency denominated commodity or commodity future contracts settlement prices, and determining a current electronic currency index price from the at least a portion of the first electronic currency denominated commodity or commodity future contracts settlement prices. The computer method includes displaying the current electronic currency index price on an electronic display. The computer method further includes setting a value of a second electronic currency to correspond to the current electronic currency index price.

31 Claims, 4 Drawing Sheets

(51) Int. Cl.
  *H04L 9/32*     (2006.01)
  *G06F 21/60*    (2013.01)
  *G06Q 10/10*    (2023.01)
  *G06F 3/0481*   (2022.01)
  *G06Q 50/16*    (2012.01)
  *G06F 3/0484*   (2022.01)

(52) U.S. Cl.
  CPC ..... *G06Q 20/0655* (2013.01); *G06Q 20/3672* (2013.01); *G06Q 20/3674* (2013.01); *G06Q 20/3676* (2013.01); *G06Q 20/3678* (2013.01); *G06Q 20/3829* (2013.01); *G06Q 50/06* (2013.01); *H04L 9/3213* (2013.01); *G06F 3/0481* (2013.01); *G06F 3/0484* (2013.01); *G06Q 50/165* (2013.01); *G06Q 2220/10* (2013.01)

(56) References Cited

U.S. PATENT DOCUMENTS

| | | | |
|---|---|---|---|
| 11,139,955 B1* | 10/2021 | So | G06F 21/645 |
| 2002/0013758 A1* | 1/2002 | Khaitan | G06Q 40/04 |
| | | | 705/37 |
| 2009/0271298 A1* | 10/2009 | Bloom | G06Q 40/04 |
| | | | 705/37 |
| 2019/0057362 A1* | 2/2019 | Wright | G06Q 20/3829 |
| 2019/0087893 A1* | 3/2019 | Pellew | G06Q 40/04 |
| 2019/0147532 A1* | 5/2019 | Singh | H04L 9/3239 |
| | | | 705/35 |
| 2019/0158275 A1* | 5/2019 | Beck | H04L 63/20 |
| 2019/0172057 A1* | 6/2019 | Vincent | H04L 9/0637 |
| 2019/0370788 A1* | 12/2019 | Aronson | G06Q 20/0655 |
| 2020/0044858 A1* | 2/2020 | Winarski | H04L 9/3239 |

* cited by examiner

COMPUTER METHOD AND GUI FOR DISPLAYING A REFLEXIVE INDEX PRICE FROM THE SETTLEMENT OF COMMODITY CONTRACTS

CROSS-REFERENCE TO RELATED APPLICATIONS

The present application claims priority benefit from U.S. Provisional Patent Application No. 62/776,918, entitled "CREATION OF REFLEXIVE INDEX PRICE FROM THE PHYSICAL SETTLEMENT OF CONTRACTS," filed Dec. 7, 2018, which application, to the extent not inconsistent with the disclosure herein, is incorporated herein by reference.

SUMMARY

According to an embodiment, a computer method and graphical user interface (GUI) for establishing and displaying a commodity price index includes receiving, via a web server, transactions for a plurality of first electronic currency denominated commodity or commodity future contracts, and recording, with a server computer operatively coupled to the web server, settlement prices for the plurality of the first electronic currency denominated commodity or commodity future contracts on a distributed ledger. The computer method includes reading, with the server computer, from the distributed ledger, at least a portion of the first electronic currency denominated commodity or commodity future contracts settlement prices, and determining, with the server computer a current commodity index price, denominated in an electronic currency, from the at least a portion of the first electronic currency denominated commodity or commodity future contracts settlement prices. The computer method includes writing the commodity index price to one or more memory locations, and writing distributed memory locations onto a distributed ledger carried by a plurality of networked devices, and transmitting current and past electronic currency-denominated commodity price index values from the server computer to a user device via a network and causing a at least the current electronic currency commodity price index to be displayed in a GUI on an electronic display of the user device.

According to an embodiment, a computer method for establishing a commodity price index includes receiving, via a web server, transactions for a plurality of first electronic currency denominated commodity or commodity future contracts, and recording, with a server computer operatively coupled to the web server, settlement prices for the plurality of the first electronic currency denominated commodity or commodity future contracts on a distributed ledger. The computer method includes reading, with the server computer, from the distributed ledger, at least a portion of the first electronic currency denominated commodity or commodity future contracts settlement prices, and determining a current electronic currency index price from the at least a portion of the first electronic currency denominated commodity or commodity future contracts settlement prices. The computer method includes displaying the current electronic currency index price on an electronic display. The computer method further includes setting a value of a second electronic currency to correspond to the current electronic currency index price.

DETAILED DESCRIPTION

Figure 1:
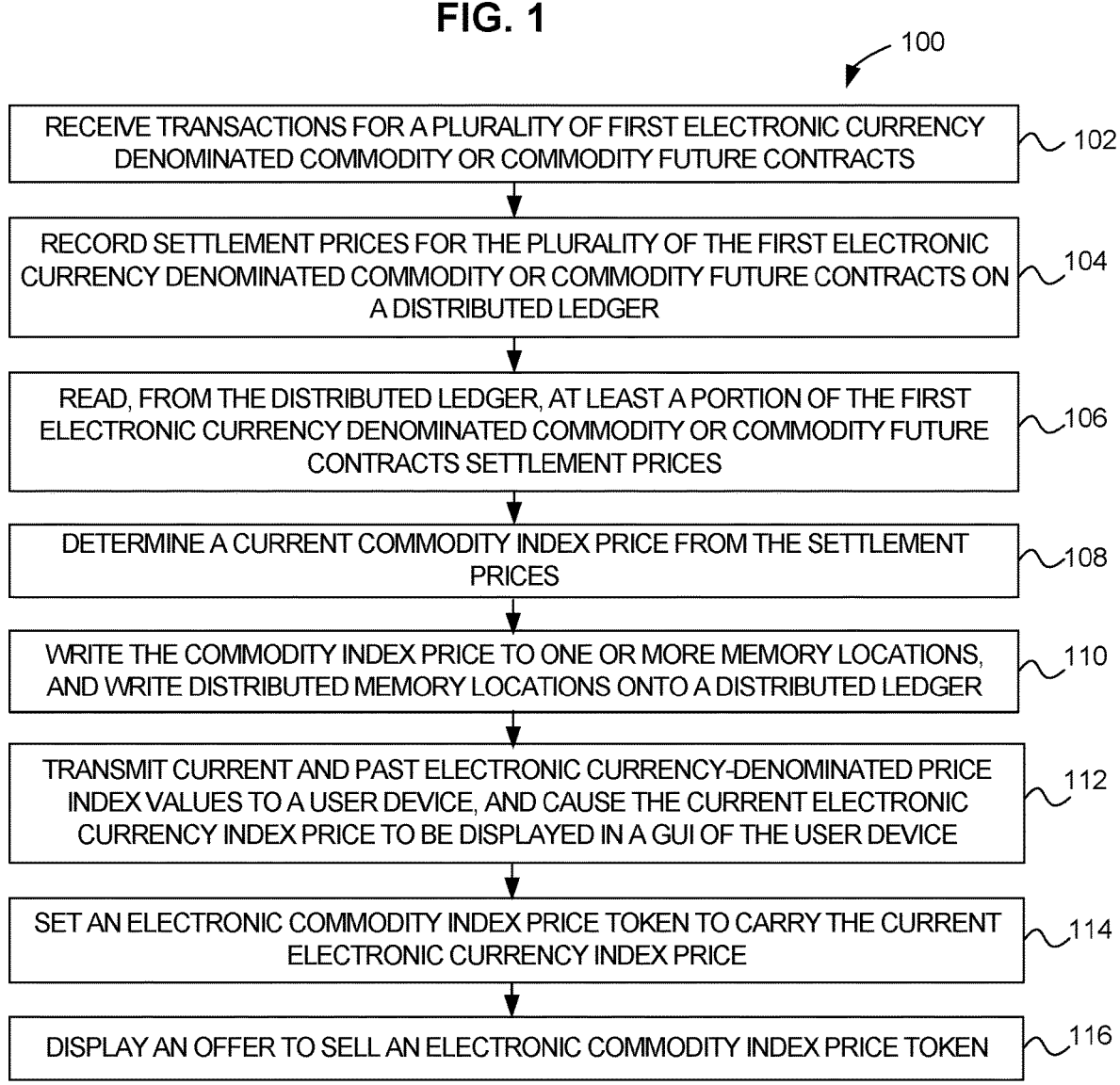
FIG. 1 is a flow chart showing a computer method for establishing and displaying a commodity price index, using a graphical user interface (GUI), according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

As used herein, the term "seller" will be understood to be, as indicated by context, interchangeable with "owner", "offering party" or "user". The "seller" will be understood to mean a user with authority to offer a commodity contract for sale, using a smart contract carried by a distributed ledger. The term "buyer" will be understood to be, as indicated by context, interchangeable with "counterparty" or "second user". The "buyer" will be understood to mean a user with authority to purchase the commodity contract from the "seller". The inventors contemplate that commodity contracts may be bought and sold multiple times before delivery to an ultimate user, and thus a user who is a "buyer" in a first transaction offering instance may become a "seller" in a second transaction offering instance.

Figure 2:
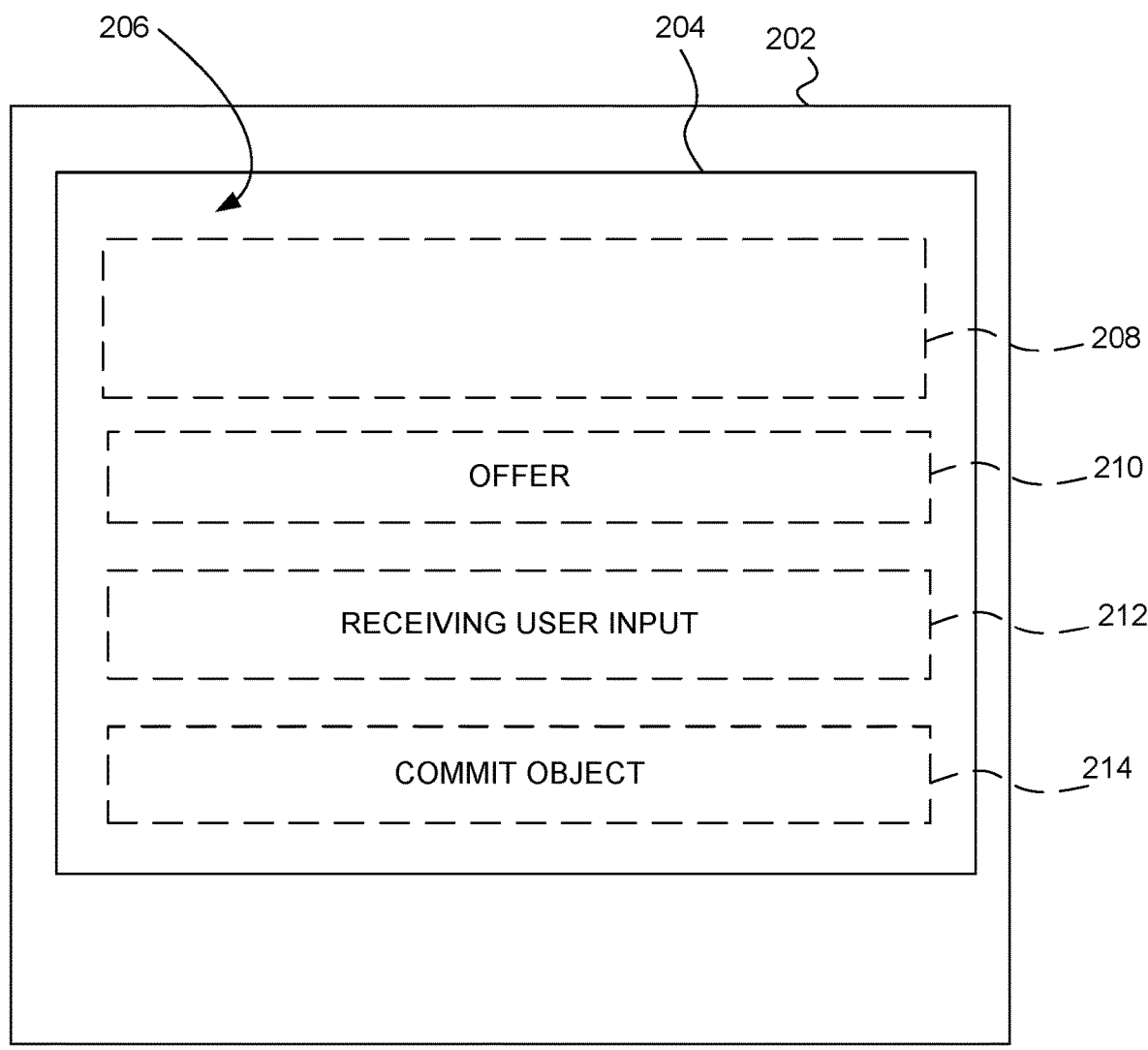
FIG. 2 is a diagram of the GUI described in conjunction with the flow chart of FIG. 1, according to an embodiment.
Figure 4:
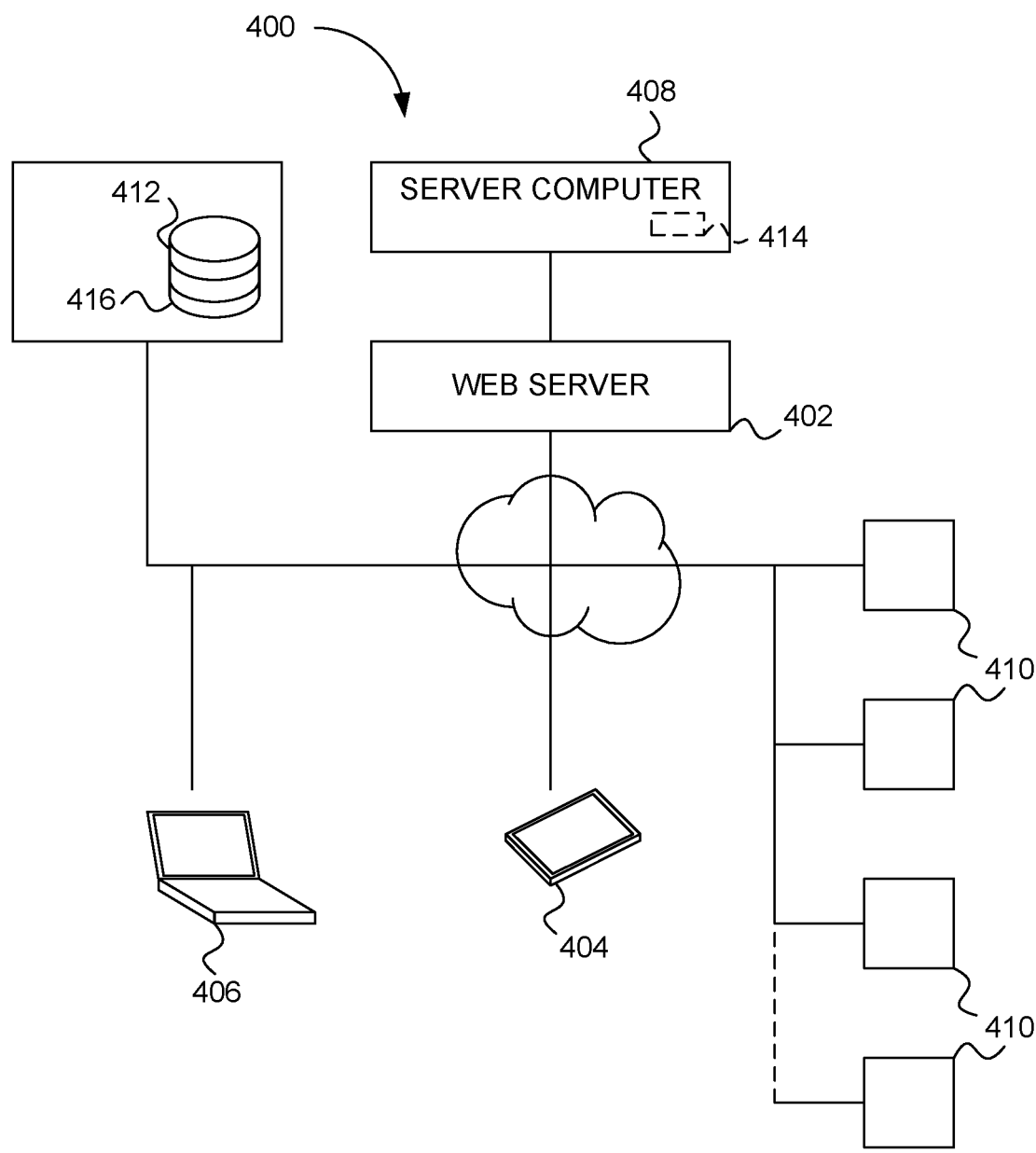
FIG. 4 is a block diagram of a computer system configured to administer a commodity material transaction using a distributed ledger, according to an embodiment.

FIG. 1 is a flow chart showing a computer method 100 for establishing and displaying a commodity price index using a GUI, according to an embodiment. FIG. 2 is a diagram of the GUI 206 described in conjunction with the computer method 100 of FIG. 1, according to an embodiment. FIG. 4 is a block diagram of a computer system 400 configured to administer a commodity material transaction using a distributed ledger, according to an embodiment.

Referring to FIGS. 1, 2, and 4, a computer method 100 for establishing and displaying a commodity price index includes, in step 102, receiving, into a server computer 408 via a web server, transactions for a plurality of first electronic currency denominated commodity or commodity future contracts. Step 104 includes recording, with the server computer 408, settlement prices for the plurality of the first electronic currency denominated commodity or commodity future contracts on a distributed ledger. Step 106 includes reading, with the server computer 408 from the distributed ledger, at least a portion of the first electronic currency denominated commodity or commodity future contracts settlement prices. Step 108 includes determining, with the server computer 408, a current commodity index price, denominated in an electronic currency, from the at least a portion of the first electronic currency denominated commodity or commodity future contracts settlement prices. Step 110 includes writing the commodity index price to one or more distributed memory locations, and writing distributed memory locations onto a distributed ledger carried by a plurality of networked devices 410. Step 112 includes transmitting current and past electronic currency-denominated commodity price index values from the server computer 408 to a user device 202, 404 via a network and causing at least the current electronic currency commodity price index 208 to be displayed in a GUI 206 on an electronic display 204 of the user device 202, 404. According to an embodiment, the computer method 100 for establishing and displaying a commodity price index includes, in step 114, setting an electronic commodity index price token to carry the current electronic currency index price and writing the token to the distributed ledger.

According to an embodiment, setting the electronic commodity index price token to carry the current electronic currency index price, in step 114, includes setting a price of the electronic commodity index price token equal to the current electronic currency-denominated commodity index price. In another embodiment, setting the electronic commodity index price token to carry the current electronic currency index price, in step 114, includes setting a fixed price of the electronic commodity index price token. Additionally and/or alternatively, setting the electronic commodity index price token to carry the current electronic currency index price, in step 114, includes recording a decryption key on the electronic token, the decryption key (with distributed index address) providing access to the one or more memory locations that carry the commodity index price.

According to an embodiment, the computer method 100 further includes causing a display, via the GUI 206 in an offer object 210, of an offer to sell an electronic commodity index price token. The computer method 100 further includes receiving an order to purchase the electronic commodity index price token from a first user via the GUI 206, and displaying fields 212 corresponding to a particular commodity contract for receiving information about a listing of a new commodity contract. The computer method 100 further includes receiving user input corresponding to the new commodity contract in the fields 212, receiving a command from the user, via a commit object 214 of the GUI 206, to commit to the listing of the new commodity smart contract using the commodity index price, and recording the information about the listing of the new commodity smart contract onto the electronic token.

According to an embodiment, the computer method 100 further includes driving, from the server computer 408, a second GUI on an electronic display on a counterparty device 406 to display the information about the listing of the new commodity smart contract. The computer method 100 further may further include receiving into the server computer 408, via the second GUI, a command from a counterparty user to purchase the new commodity smart contract. Upon receiving the command from the counterparty, the server computer may transfer an amount of electronic currency corresponding to the commodity index price from a counterparty wallet to a seller wallet, and transfer the electronic token from the seller wallet to the counterparty wallet.

According to an embodiment, the computer method 100 further includes receiving, via the second GUI from the counterparty, a command to make the information about the listing of the new commodity smart contract available for view by traders in the smart commodity contracts. According to an embodiment, the computer method 100 further includes causing the token to be priced at a value corresponding to the electronic commodity index price.

According to an embodiment, the computer method 100 further includes receiving, via the web server into the server computer, a new transaction for the plurality of the first electronic currency denominated commodity or commodity future contracts with the first electronic currency valued at the current electronic currency index price.

According to an embodiment, in step 108, determining the current electronic currency commodity index price includes performing a calculation per detected event with the server computer. In an embodiment, the detected event comprises a settlement. Additionally and/or alternatively, the detected event comprises a time tick signal. According to another embodiment, in step 108, determining the current electronic currency commodity index price includes determining a commodity index price equal to a multiple or fraction of the most recent commodity or commodity future contract settlement price. In another embodiment, in step 108, determining the current electronic currency commodity index price includes adjusting the one or more commodity or commodity future settlement prices to account for a delivery location. Additionally and/or alternatively, in step 108, determining the current electronic currency commodity index includes performing a weighted average of a plurality of transactions. In one embodiment, the weighted average is selected to smooth fluctuations in the current electronic currency commodity index price. In another embodiment, the weighted average is selected to weight more recent transactions more heavily. According to an embodiment, in step 108, determining the current electronic currency index price includes performing a curve fitting of a plurality of transactions.

According to an embodiment, the commodity or commodity future settlement prices include commodity settlement prices. Additionally and/or alternatively, the commodity or commodity future settlement prices include commodity future settlement prices.

According to an embodiment, the distributed ledger is stored on one or more computer readable media. In one embodiment, the distributed ledger includes a blockchain. In another embodiment, the blockchain includes a public blockchain. Additionally and/or alternatively, the blockchain includes a private blockchain. In another embodiment, the blockchain includes a permissioned blockchain.

According to an embodiment, in step 104, recording, with the server computer operatively coupled to the web server, the settlement prices for the plurality of the first electronic currency denominated commodity or commodity future contracts on the distributed ledger includes encrypting the smart contract. Additionally and/or alternatively, recording, with the server computer operatively coupled to the web server, the settlement prices for the plurality of the first electronic currency denominated commodity or commodity future contracts on the distributed ledger includes storing the settlement prices at one or more cloud locations, encrypting the one or more cloud locations, and entering the encrypted one or more cloud locations onto the distributed ledger as a transaction.

According to an embodiment, the commodity is a physical commodity. In one embodiment, the physical commodity includes one of a refined fuel and an unrefined fuel. In an additional embodiment, the refined fuel or the unrefined fuel includes a fossil fuel. In another embodiment, the physical commodity is an unrefined or refined mining extract. Additionally and/or alternatively, the physical commodity is a food.

Figure 3:
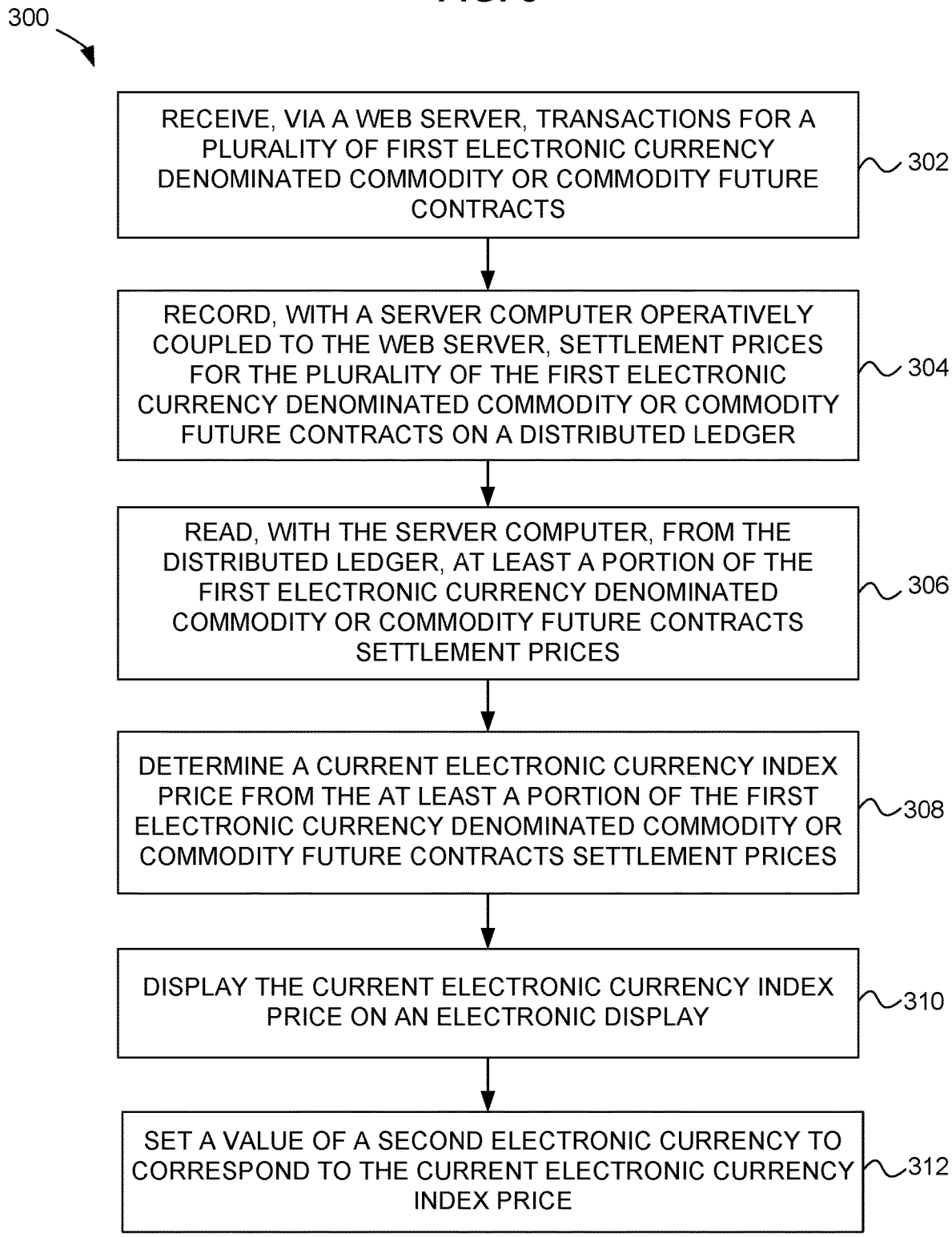
FIG. 3 is a flow chart showing a computer method for establishing a commodity price index, according to an embodiment.

FIG. 3 is flow chart showing a computer method 300 for establishing a commodity price index, according to an embodiment.

According to an embodiment, the computer method 300 for establishing a commodity price index includes, in step 302, receiving, via a web server, transactions for a plurality of first electronic currency denominated commodity or commodity future contracts. Step 304 includes recording, with a server computer operatively coupled to the web server, settlement prices for the plurality of the first electronic currency denominated commodity or commodity future contracts on a distributed ledger. Step 306 includes reading, with the server computer, from the distributed ledger, at least a portion of the first electronic currency denominated commodity or commodity future contracts settlement prices. Step 308 includes determining a current electronic currency index price from the at least a portion of the first electronic currency denominated commodity or commodity future contracts settlement prices. Step 310 includes displaying the current electronic currency index price on an electronic display.

According to an embodiment, the computer method 300 further includes, in step 312, setting a value of a second electronic currency to correspond to the current electronic currency index price.

According to an embodiment, the first electronic currency and the second electronic currency are the same electronic currency.

According to an embodiment, the computer method 300 further includes receiving, via the web server, a new transaction for the plurality of the first electronic currency denominated commodity or commodity future contracts with the first electronic currency valued at the current electronic currency index price.

According to an embodiment, in step 308, determining the current electronic currency index price includes performing a calculation per detected event with a computer processor. In an embodiment, the detected event comprises a settlement. Additionally and/or alternatively, the detected event comprises a time tick signal. According to another embodiment, in step 308, determining the current electronic currency index price includes determining an index price equal to a multiple or fraction of the most recent commodity or commodity future contract settlement price. In another embodiment, in step 308, determining the current electronic currency index price includes adjusting the one or more commodity or commodity future settlement prices to account for a delivery location. Additionally and/or alternatively, in step 308, determining the current electronic currency index price includes performing a weighted average of a plurality of transactions. In one embodiment, the weighted average is selected to smooth fluctuations in the current electronic currency index price. In another embodiment, the weighted average is selected to weight more recent transactions more heavily. According to an embodiment, in step 308, determining the current electronic currency index price includes performing a curve fitting of a plurality of transactions.

According to an embodiment, the commodity or commodity future settlement prices include commodity settlement prices. Additionally and/or alternatively, the commodity or commodity future settlement prices include commodity future settlement prices.

According to an embodiment, the distributed ledger is stored on one or more computer readable media. In one embodiment, the distributed ledger includes a blockchain. In another embodiment, the blockchain includes a public blockchain. Additionally and/or alternatively, the blockchain includes a private blockchain. In another embodiment, the blockchain includes a permissioned blockchain.

According to an embodiment, in step 304, recording, with the server computer operatively coupled to the web server, the settlement prices for the plurality of the first electronic currency denominated commodity or commodity future contracts on the distributed ledger includes encrypting the smart contract. Additionally and/or alternatively, recording, with the server computer operatively coupled to the web server, the settlement prices for the plurality of the first electronic currency denominated commodity or commodity future contracts on the distributed ledger includes storing the settlement prices at one or more cloud locations, encrypting the one or more cloud locations, and entering the encrypted one or more cloud locations onto the distributed ledger as a transaction.

According to an embodiment, the commodity is a physical commodity. In one embodiment, the physical commodity includes one of a refined fuel and an unrefined fuel. In an additional embodiment, the refined fuel or the unrefined fuel includes a fossil fuel. In another embodiment, the physical commodity is an unrefined or refined mining extract. Additionally and/or alternatively, the physical commodity is a food.

FIG. 4 is a block diagram of a computer system 400 configured to administer a commodity material transaction using a distributed ledger, according to an embodiment. As used herein, the term distributed ledger will be understood to include blockchains of various ilks. Illustrated elements described in conjunction with this figure may be described elsewhere herein and may bear dissimilar reference numbers. Corresponding elements will be understood as equivalent as indicated by context.

According to an embodiment, the computer system 400 may include a web server 402 configured to output a first GUI to a first device 404 for a party to receive and display information related to a commodity material transaction smart contract, according to an embodiment. The web server 402 may be further configured to output a second GUI to a second device 406 for a counterparty to receive and display information related to a commodity material transaction smart contract, according to an embodiment. The computer system 400 may include a server computer 408, operatively coupled to the web server 402, and configured to execute data transfer and distributed ledger transactions. The server computer 408 may be further configured to transmit display data to and receive user input from the web server 402, for relay to and from the first and the second devices 404, 406.

According to an embodiment, the computer system 400 may include a plurality of devices 410 operatively coupled to the web server 402 and carrying the distributed ledger. The web server 402 may be configured to transmit the distributed ledger transactions to the plurality of devices 410, according to an embodiment. The plurality of devices 410 may be configured to collectively validate the distributed ledger transactions, according to an embodiment. The web server 402 may be configured to receive and forward collective validation to the server computer 408, according to an embodiment.

According to an embodiment, the server computer 408 may be further configured to transfer a first cryptocurrency and/or digital security associated with commodity transactions corresponding to transactions between a counterparty wallet 412 and a transaction wallet 414 via the web server 402. The server computer 408 may issue a distributed ledger token corresponding to one or more commodity material transactions, according to an embodiment.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for establishing and displaying a commodity price index using a graphical user interface (GUI), comprising:
   receiving, via a web server, transactions for a plurality of first electronic currency denominated commodity or commodity future contracts;
   recording, with a server computer operatively coupled to the web server, settlement prices for the plurality of the first electronic currency denominated commodity or commodity future contracts on a distributed ledger;
   reading, with the server computer, from the distributed ledger, at least a portion of the first electronic currency denominated commodity or commodity future contracts settlement prices;
   determining, with the server computer a current commodity index price, denominated in an electronic currency, from the at least a portion of the first electronic currency denominated commodity or commodity future contracts settlement prices;
   writing the commodity index price to one or more memory locations, and writing distributed memory locations onto the distributed ledger carried by a plurality of networked devices;
   transmitting the current commodity index price and past electronic currency-denominated commodity price index values from the server computer to a user device via a network and causing at least the current electronic currency commodity price index to be displayed in a GUI on an electronic display of the user device; and
   setting an electronic commodity index price token to carry the current electronic currency index price, wherein setting an electronic commodity index price token to carry the current electronic currency index price includes recording a decryption key on the electronic token, the decryption key providing access to the one or more memory locations that carry the commodity index price.

2. The computer method for establishing and displaying a commodity price index of claim 1, wherein setting an electronic commodity index price token to carry the current electronic currency index price includes setting a price of the electronic commodity index price token equal to the current electronic currency-denominated commodity index price.

3. The computer method for establishing and displaying a commodity price index of claim 1, wherein setting an electronic commodity index price token to carry the current electronic currency index price includes setting a fixed price of the electronic commodity index price token.

4. The computer method for establishing and displaying a commodity price index of claim 1, further comprising:
   causing display, via the GUI, an offer to sell an electronic commodity index price token,
   receiving an order to purchase the electronic commodity index price token from a user, via the GUI;
   displaying fields corresponding to a particular commodity contract for receiving information about a listing of a new commodity contract;
   receiving user input corresponding to the new commodity contract in the fields;
   receiving a command from the user, via a commit object of the GUI, to commit to the listing of the new commodity smart contract using the commodity index price; and
   recording the information about the listing of the new commodity smart contract onto the electronic token.

5. The computer method for establishing and displaying a commodity price index of claim 4, further comprising:
   driving, from the server computer, second GUI on an electronic display on a counterparty device to display the information about the listing of the new commodity smart contract;
   receiving into the server computer, via the second GUI, a command from a counterparty user to purchase the new commodity smart contract;
   transferring an amount of electronic currency corresponding to the commodity index price from a counterparty wallet to a seller wallet; and
   transferring the electronic token from the seller wallet to the counterparty wallet.

6. The computer method for establishing and displaying a commodity price index of claim 5, further comprising:
   receiving, via the second GUI from the counterparty, a command to make the information about the listing of the new commodity smart contract available for view by traders in the smart commodity contracts.

7. The computer method for establishing and displaying a commodity price index of claim 6, further comprising:
   causing the token to be priced at a value corresponding to the electronic commodity index price.

8. The computer method for establishing and displaying a commodity price index of claim 1, further comprising:
   receiving, via the web server into the server computer, a new transaction for the plurality of the first electronic currency denominated commodity or commodity future contracts with the first electronic currency valued at the current electronic currency index price.

9. The computer method for establishing and displaying a commodity price index of claim 1, wherein determining the current electronic currency commodity index price includes performing a calculation per detected event with the server computer.

10. The computer method for establishing and displaying a commodity price index of claim 4, wherein the detected event comprises a settlement.

11. The computer method for establishing and displaying a commodity price index of claim 4, wherein the detected event comprises a time tick signal.

12. The computer method for establishing and displaying a commodity price index of claim 1, wherein determining the current electronic currency commodity index price includes determining an commodity index price equal to a multiple or fraction of the most recent commodity or commodity future contract settlement price.

13. The computer method for establishing and displaying a commodity price index of claim 1, wherein determining the current electronic currency commodity index price includes adjusting the one or more commodity or commodity future settlement prices to account for a delivery location.

14. The computer method for establishing and displaying a commodity price index of claim 1, wherein determining the current electronic currency commodity index price includes performing a weighted average of a plurality of transactions.

15. The computer method for establishing and displaying a commodity price index of claim 14, wherein the weighted average is selected to smooth fluctuations in the current electronic currency commodity index price.

16. The computer method for establishing and displaying a commodity price index of claim 14, wherein the weighted average is selected to weight more recent transactions more heavily.

17. The computer method for establishing and displaying a commodity price index of claim 1, wherein determining the current electronic currency index price includes performing a curve fitting of a plurality of transactions.

18. The computer method for establishing and displaying a commodity price index of claim 1, wherein the commodity or commodity future settlement prices comprise commodity settlement prices.

19. The computer method for establishing and displaying a commodity price index of claim 1, wherein the commodity or commodity future settlement prices comprise commodity future settlement prices.

20. The computer method for establishing and displaying a commodity price index of claim 1, wherein the distributed ledger is stored on one or more computer readable media.

21. The computer method for establishing and displaying a commodity price index of claim 20, wherein the distributed ledger includes a blockchain.

22. The computer method for establishing and displaying a commodity price index of claim 21, wherein the blockchain includes a public blockchain.

23. The computer method for establishing and displaying a commodity price index of claim 21, wherein the blockchain includes a private blockchain.

24. The computer method for establishing and displaying a commodity price index of claim 21, wherein the blockchain includes a permissioned blockchain.

25. The computer method for establishing and displaying a commodity price index of claim 20, wherein recording, with the server computer operatively coupled to the web server, the settlement prices for the plurality of the first electronic currency denominated commodity or commodity future contracts on the distributed ledger includes encrypting the smart contract.

26. The computer method for establishing and displaying a commodity price index of claim 25, wherein recording, with the server computer operatively coupled to the web server, the settlement prices for the plurality of the first electronic currency denominated commodity or commodity future contracts on the distributed ledger includes:
  storing the settlement prices at one or more cloud locations;
  encrypting the one or more cloud locations; and
  entering the encrypted one or more cloud locations onto the distributed ledger as a transaction.

27. The computer method for establishing and displaying a commodity price index of claim 1, wherein the commodity is a physical commodity.

28. The computer method for establishing and displaying a commodity price index of claim 27, wherein the physical commodity includes one of a refined fuel and an unrefined fuel.

29. The computer method for establishing and displaying a commodity price index of claim 28, wherein the refined fuel or the unrefined fuel includes a fossil fuel.

30. The computer method for establishing and displaying a commodity price index of claim 27, wherein the physical commodity is an unrefined or refined mining extract.

31. The computer method for establishing and displaying a commodity price index of claim 27, wherein the physical commodity is a food.

* * * * *